United States Patent
Masson

(10) Patent No.: US 7,386,395 B1
(45) Date of Patent: Jun. 10, 2008

(54) SYSTEMS AND METHODS FOR SHOCK COMPENSATION UTILIZING AN ADAPTIVE CONTROL TECHNIQUE ALGORITHM

(75) Inventor: Siméon Masson, Tampa, FL (US)

(73) Assignee: Honeywell International Inc., Morristown, NJ (US)

( * ) Notice: Subject to any disclaimer, the term of this patent is extended or adjusted under 35 U.S.C. 154(b) by 84 days.

(21) Appl. No.: 11/037,794

(22) Filed: Jan. 18, 2005

(51) Int. Cl.
*G01C 21/00* (2006.01)
*G01P 15/00* (2006.01)

(52) U.S. Cl. .......... 701/220; 701/200; 701/221; 342/357.02; 342/357.03; 342/357.14; 73/1.37; 73/1.38; 73/1.78

(58) Field of Classification Search .......... 342/357.14, 342/357.02, 357.03; 701/200, 220, 221; 702/85, 86, 94–96; 73/1.37, 1.38, 1.78; 244/3.2
See application file for complete search history.

(56) References Cited

U.S. PATENT DOCUMENTS

| 6,259,380 B1 * | 7/2001 | Jensen .......... 340/970 |
| 6,480,152 B2 * | 11/2002 | Lin et al. .......... 342/357.14 |
| 7,032,857 B2 * | 4/2006 | Hua .......... 244/3.15 |
| 2004/0133346 A1 * | 7/2004 | Bye et al. .......... 701/210 |
| 2006/0161329 A1 * | 7/2006 | Crane et al. .......... 701/93 |

OTHER PUBLICATIONS

Crossbow Technology, Inc. "IMU 6DOF Inertial Measurement Unit", , p. 2 pgs.
Honeywell International, Inc., "HG1700 Inertial Measurement Unit", Aug. 6, 2003, p. 2, Publisher: Honeywell International, Inc.
DEFENSELINK, "Memorandum for Correspondents", Aug. 26, 1997, p. 1, Publisher: http://www.defenselink.mil/news/aug1997/m08261997_m147-97.html.

* cited by examiner

*Primary Examiner*—Khoi H. Tran
*Assistant Examiner*—Chuong Nguyen
(74) *Attorney, Agent, or Firm*—McDonnell Boehnen Hulbert & Berghoff LLP

(57) ABSTRACT

A method for providing dynamic disturbance compensation to an inertial system is described. The method includes determining estimated correction factors based on received acceleration components, and dynamically determining filter coefficients for a filter configured to receive velocity and position signals and output a prediction error. The method further includes combining the estimated correction factors and the prediction error into adjustment factors, where the prediction error is configured to be a feedback control signal, and applying the adjustment factors to compensate the inertial system such that effects of the dynamic disturbance are removed.

12 Claims, 3 Drawing Sheets

SYSTEMS AND METHODS FOR SHOCK COMPENSATION UTILIZING AN ADAPTIVE CONTROL TECHNIQUE ALGORITHM

BACKGROUND OF THE INVENTION

This invention relates generally to flight control systems, and more specifically, to methods and systems for providing dynamic disturbance compensation for a flight platform, for example, shock compensation during a flight utilizing adaptive control techniques.

An inertial sensor assembly (ISA), typically includes an inertial measurement unit (IU) that detects acceleration and rotation in three planes. A typical IMU includes three accelerometers and three rotational rate sensors arranged with their input axes in a perpendicular relationship. The accelerometers and sensors are generally rigidly and precisely mounted within a housing along with other related electronics and hardware. Commonly, the housing is mounted to a support or chassis through suspension mounts or vibration isolators. The chassis is rigidly and precisely mounted to a frame of a vehicle, such as an aircraft or missile. An ISA typically forms a portion of a flight control system.

Certain components of flight control systems, for example, the above described inertial measurement units (IMUs), are likely to experience performance degradation when exposed to motion as a result of body bending and induced vibration. Such motions are typically high shock transients at low frequencies.

Example applications where such shock transient conditions are encountered include missile and other interceptor applications. In missile and interceptor flight control systems, the IMU is likely to sustain shock wave transients at accelerations up to multiple G levels over a period of time. These shock wave transients, when above predefined and specified thresholds, may be destructive to the IMU. However, the IMU is required to provide accurate and reliable navigation in order to achieve mission success. Consequently, an IMU is called upon to operate reliably in a highly vibratory environment accommodating low frequency/high amplitudes and high frequency/low amplitudes conditions. Therefore, accelerations sensed by the IMU due to missile vibration are to be resolved into the IMU chosen navigation reference frame.

BRIEF SUMMARY OF THE INVENTION

In one aspect, a method for providing dynamic disturbance compensation to an inertial system is provided. The method comprises determining estimated correction factors based on received acceleration components, and dynamically computing filter coefficients for a filter configured to receive velocity and position signals and output a prediction error. The method further comprises synthesizing estimated correction factors and the prediction error into adjustment factors, where the prediction error is configured to be a feedback control signal to compensate the inertial system such that effects of the dynamic disturbance are attenuated.

In another aspect, a control system configured to provide dynamic disturbance compensation to an inertial system is provided. The control system comprises an estimator configured with navigational estimates and a filter configured to receive velocity and position signals from the inertial system. The estimator is further configured to receive acceleration data from the inertial system and estimate correction factors based on received acceleration data. The filter is further configured with a linear predictive coding algorithm configured to determine coefficients for the filter that provides compensated velocity and position signals. The control system further comprises a corrector configured to receive the estimated correction factors and the filter compensated velocity and position signals. The corrector is fuirther configured to detect errors related to acceleration variations and compute adjustments to compensate for the acceleration variations.

DETAILED DESCRIPTION OF THE INVENTION

At least some known inertial measurement units, sometimes referred to as IMU packages, are not currently capable of surviving shocks and vibrations that result from accelerations exceeding certain acceleration (G) levels. The systems and methods described herein provide in-system dynamic compensation to known IMU packages and reduce the sensitivity of such IMU packages to high shock and vibration levels. The systems and methods are also applicable to other systems that require control and attenuation of high shock and vibration levels.

Figure 1:
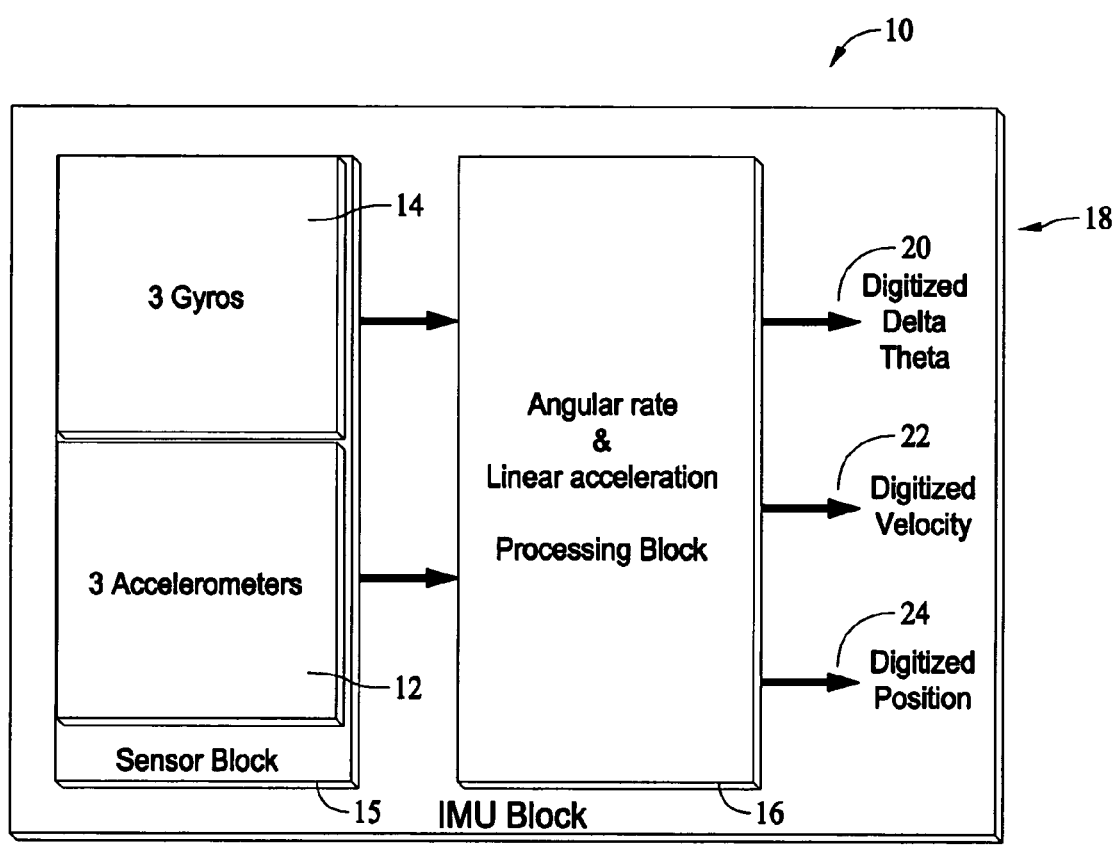
FIG. 1 is a block diagram of an inertial measurement unit.

FIG. 1 is a block diagram of an inertial measurement unit (IMU) 10. IMU 10 includes accelerometers 12 and gyroscopes 14 in a sensor block 15 providing inertial data to a processing block 16 which includes at least one analog to digital converter (not shown). In a typical embodiment, accelerometers 12 includes three orthogonal accelerometers and gyroscopes 14 includes three orthogonal gyroscopes. Various types of accelerometers and gyroscopes are known. In the embodiment illustrated, data from accelerometers 12 and gyroscopes 14 is processed by processin block 16. IMU 10 further includes digital outputs 18 providing at least one acceleration output (digitized delta theta 20) for utilization by systems external to IMU10. Processing block 16 further provides digitized velocity outputs 22 and digitized position outputs 24 for utilization by external systems. Processing block 16 may also provide additional data relating to the operation of gyroscopes 14 to one or more analog outputs (not shown).

Figure 2:
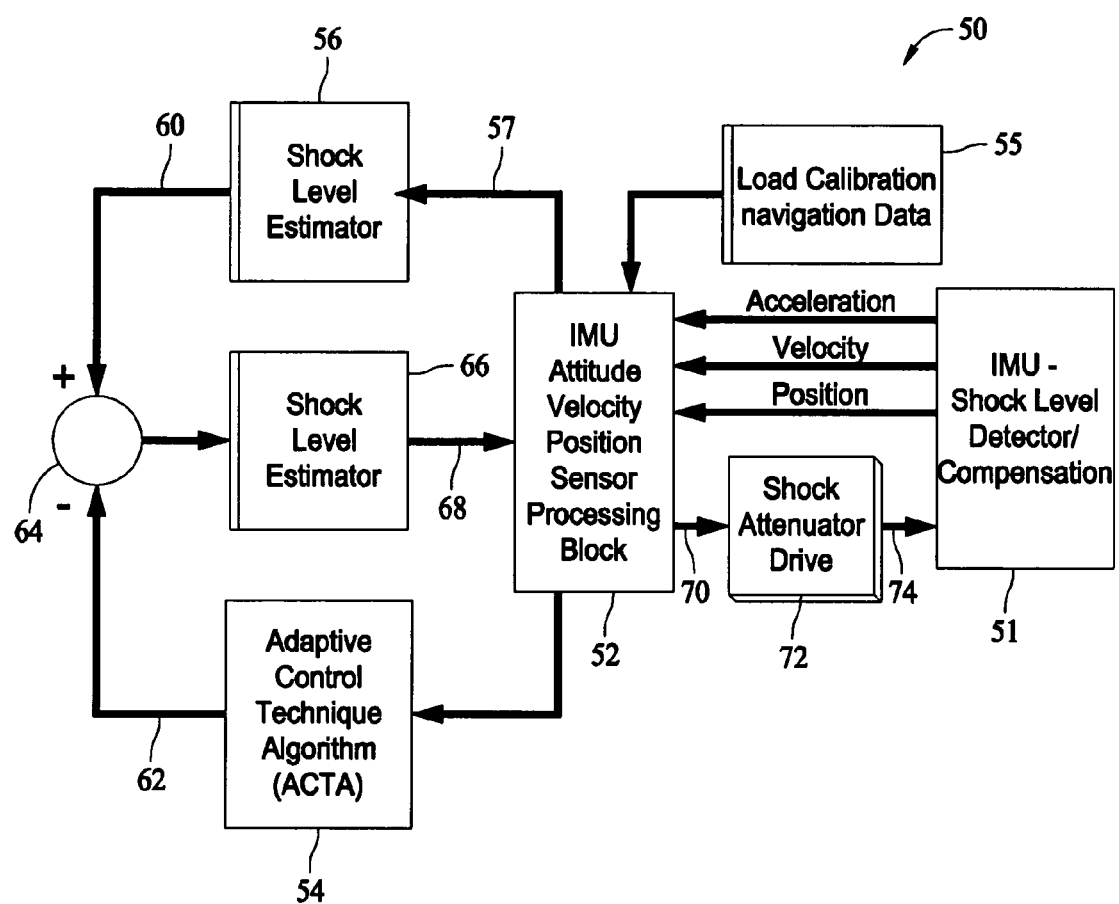
FIG. 2 is a block diagram of a dual mode shock compensator control system for inertial measurement units.

FIG. 2 is a block diagram of a dual mode shock compensator control system 50 which is incorporated in an inertial measurement unit, for example IMU 10 (also shown in FIG. 1). As illustrated, an IMU shock level compensator 51 provides IMU data, specifically, digitized, sensed data including acceleration, velocity, and displacement, as determined by IMU 10 to an attitude, velocity, position sensor processing block 52 which in turn provides the acceleration, velocity and position data to an adaptive control technique algorithm (ACTA) 54. Sensor processing block 52 also receives navigation calibration data 55.

In one embodiment, ACTA 54 incorporates a re-configurable field programmable gate array (FPGA) technique implementing a linear predictive coding functions algorithm. The linear predictive coding functions algorithm dynamically determines coefficients for a finite impulse response (FIR) filter within ACTA 54. In one embodiment, the linear predictive coding functions algorithm is an estimation algorithm, which implements prediction functions based on orthogonality linear prediction. Such an implementation involves determining a prediction error by determining a difference between the estimate and the sample value. The error is then directly correlated to the summation of a set of linear product terms consisting of predictor coefficients and the sample value. Predictor coefficients are then determined using a least squares approach.

The FIR filter then compensates, or weighs, the velocity and position signals originating from the sensors within the IMU. The compensation of the velocity and position signals, based on the linear predictive coding functions algorithm, results in FIR filter coefficients that are dynamically computed and synthesized. The dynamic computation of the FIR filter coefficients ensures that an output of the FIR filter is a minimal prediction error. As such, output characteristics of the filter result in estimates of optimal coefficients at specific times based on the best prediction and correction factors for the filter implementation. The prediction error is utilized as a feedback control signal.

A shock level estimator 56, in one embodiment, is a Kalman Filter based algorithm that implements a capability to be initially loaded with measured and calibrated navigational estimates via sensor processing block 52. The navigational estimates are based on a recursive method for the least squares estimation of coefficients for a linear system. The recursive method predicts changes since the last estimate and corrects these changes in real-time using a state-space model to handle the times and measurement updates of the system dynamics. Such methods include time and measurement updates which are utilized in determining prediction and correction error estimates and covariance. In addition, shock level estimator 56 is configured to be periodically updated with data originating from the sensors within the IMU. Data originating from IMU sensors received by shock level estimator 56 includes acceleration components (e.g., velocity and position) that have been integrated once to provide an IMU computed velocity, and integrated twice to provide an IMU computed position.

In one embodiment, acceleration components 57 are representative of six dimensional state variables with respect to a space fixed reference frame used in conjunction with a direction cosine matrix calculated from gyroscopes within the IMU for gravity compensation. In strap-down system mechanization, where both gyroscopes and accelerometers of the IMU are mounted on the vehicle/missile platform, having the sensitive axes of the gyroscopes orthogonal to the axes of the accelerometer enables velocity and position resolution by twice integrating the true acceleration derived and measured from the accelerometers. Therefore, a measure of the vehicle/missile body attitude using the gyroscope angular rate is achieved, from which the direction cosine matrix is determined and calculated.

Shock level estimator 56 provides estimated correction factors 60 which are combined with the prediction errors within feedback control signals 62 from ACTA 54 by summing component 64. This combination enables dynamic compensation for an IMI (e.g., IMU 10) used in a strapdown inertial system mechanization. The compensation is applicable when the missile experiences fast turn rates and high acceleration during its flight path (i.e. navigation errors increasing due to high acceleration and rapid turn rates and their effects upon the IMU).

A shock level corrector 66 receives the combined estimated correction factors 60 and the prediction errors within feedback control signals 62 and detects errors between the two that are related to variations in the state variables. Such errors are detected, in one embodiment, using time and measurement update estimates through implementation of prediction and correction estimation algorithms. In one embodiment, these estimation algorithms are based on Kalman filter algorithms.

Upon receipt of these state variable variations, shock level corrector 66 is configured to compute appropriate adjustment factors 68 based on the state variable variations which are then input into sensor processing block 52 which calculates driving signals 70 that are applied to a shock attenuator drive 72 which then provides compensation signals 74 for the IMU. In one embodiment, these adjustment factors are actual measurements that are computed to correct projected estimates in real-time. The adjustment factors are then conditioned by shock actuator drive 72 to provide appropriate compensation signals 74. As a result, shock actuator drive 72 actively damps any oscillations and vibrations associated with the detected errors through compensation signals 74.

Figure 3:
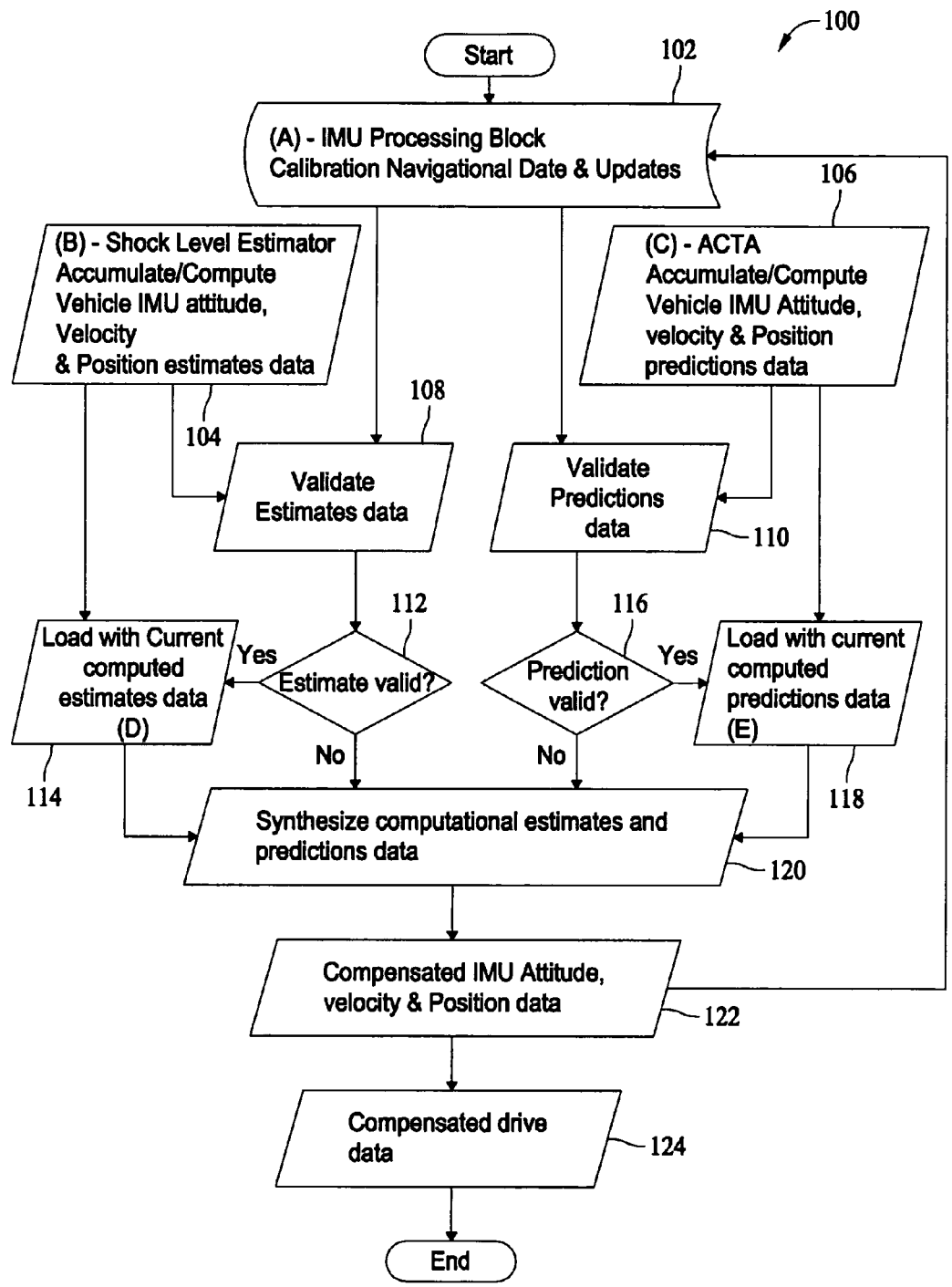
FIG. 3 is a flow chart illustrating operation of the dual mode shock compensator control system of FIG. 2.

FIG. 3 is a flow chart 100 which further illustrates the methods performed by shock compensator control system 50 (shown in FIG. 2). Specifically, sensor processing block receives 102 calibration and navigational data updates. Separately, shock level estimator 56 (shown in FIG. 2) accumulates and computes 104 IMU based vehicle attitude, velocity, and position estimates. ACTA 54 (shown in FIG. 2) accumulates and computes 106 IMU based vehicle attitude, velocity, and position predictions.

The attitude, velocity, and position estimates are validated 108 against the calibration and navigational data updates and the attitude, velocity, and position predictions are validated 110 against the calibration and navigational data updates. It is then determined 112 whether the validated, estimated attitude, velocity, and position are valid. If so, shock level estimator 56 is loaded 114, with the current estimates of attitude, velocity, and position. It is also determined 116 whether the validated, predicted attitude, velocity, and position are valid. If so, ACTA 54 is loaded 118, with the current predictions of attitude, velocity, and position.

Invalid estimates and predictions of attitude, velocity, and position and loaded 114 estimates and loaded 118 predictions are synthesized 120 resulting in compensated 122 IMU attitude, velocity, and position data. The compensated IMU attitude, velocity, and position data is then utilized to provide 124 driving signals 70 that are applied to a shock attenuator drive 72.

The filter coefficients from ACTA 54 are utilized with estimated correction factors from shock level estimator 56 to generate the above described adjustment factors for the state variables. The adjustment factors are utilized to actively compensate and damp shock and vibration within an IMU by monitoring and adapting to changes and extracting only appropriate control signals.

Utilization of adaptive control technique algorithm (ACTA) 54 combined with the above described dual mode feedforward and feedback control system 50 is an integral component of an IIU, for example IMU 10 (shown in FIG. 1) or any other system that requires active shock and vibration disturbance rejection. In the case of an IMU utilized in a missile, control system 50 enables in-system dynamic compensation for the IMU when exposed to shock wave transient conditions during the flight of the missile. The dynamic compensation results as dual mode feedforward and feedback control system 50 continuously performs shock level estimation and correction, and senses acceleration, velocity and displacement, respectively. ACTA 54, which is based on re-configurable hardware digital filter functions, for example, finite impulse response (FIR) functions, filters sensed acceleration, velocity and displacement feedback signals to effectively enable shock and vibration active damping capability for each axis of the tri-axial accelerometers utilized in certain IMUs. The tri-axial accelerometers within these IMUs are based on an orthogonal configuration in such a way that acceleration, velocity and displacement will synthesize the feedback control to dynamically compensate for shock and vibration levels exceeding pre-defined shock and vibration thresholds for the IMUs.

The above described methods and systems address the need for shock and vibration disturbance rejection in missile, interceptor, and other similar inertial guidance systems. While the invention has been described in terms of various specific embodiments, those skilled in the art will recognize that the invention can be practiced with modification within the spirit and scope of the claims.

What is claimed is:

1. A control system configured to provide dynamic disturbance compensation to an inertial system, said system comprising:
    an estimator configured with calibrated navigational estimates and further configured to receive acceleration data from the inertial system and estimate correction factors based on received acceleration data;
    a filter configured to receive velocity and position signals from the inertial system, said filter further configured with a linear predictive coding algorithm which determines coefficients for said filter, said filter providing filter compensated velocity and position signals; and
    a corrector configured to receive the estimated correction factors and the filter compensated velocity and position signals, said corrector further configured to detect errors related to acceleration variations and compute adjustments to compensate for the acceleration variations, said adjustments provided as a feedback control system to the inertial system, thereby providing dynamic disturbance compensation.

2. A control system according to claim 1 wherein said estimator is configured to validate attitude, velocity, and position estimates against calibration and navigational data updates.

3. A control system according to claim 1 wherein said filter is configured to validate attitude, velocity, and position predictions against calibration and navigational data updates.

4. A control system according to claim 1 further comprising a shock attenuator drive providing drive signals to the inertial system, wherein said corrector is configured to apply the computed adjustments to said shock attenuator drive.

5. A control system according to claim 1 wherein said estimator comprises a Kalman filter.

6. A control system according to claim 1 wherein said estimator is configured to:
    predict changes to the correction factors since the previous estimation of correction factors; and
    correct the predicted changes utilizing a state-space model.

7. A control system according to claim 1 wherein said estimator is configured to:
    integrate acceleration data once to determine a velocity; and
    integrate acceleration data twice to determine a position.

8. A control system according to claim 1 wherein the acceleration data received by said estimator is representative of six dimensional state variables with respect to a space fixed reference frame used in conjunction with a direction cosine matrix.

9. A control system according to claim 1 wherein to implement the linear predictive coding functions algorithm said filter comprises a re-configurable field programmable gate array technique.

10. A control system according to claim 9 wherein said filter implements predictive coding functions based on orthogonality linear predictions.

11. A control system according to claim 9 wherein said filter is configured to determine a prediction error based on a difference between an estimate from the linear predictive coding functions algorithm and a sample value.

12. A control system according to claim 1 wherein said filter comprises a finite impulse response (FIR) filter, said filter configured to utilize the linear predictive coding algorithm configured to determine coefficients which minimize a prediction error.

* * * * *